United States Patent [19]
Mattia

[11] Patent Number: 6,015,283
[45] Date of Patent: Jan. 18, 2000

[54] MOLD PLATE CENTRALIZING SYSTEM

[75] Inventor: Daniel Mattia, Union, N.J.

[73] Assignee: National Tool & Manufacturing Co., Kenilworth, N.J.

[21] Appl. No.: 09/090,654

[22] Filed: Jun. 4, 1998

Related U.S. Application Data

[60] Provisional application No. 60/048,506, Jun. 4, 1997.

[51] Int. Cl.[7] ..................................................... B29C 45/64
[52] U.S. Cl. .......................... 425/556; 425/338; 425/588; 425/592; 425/441
[58] Field of Search ..................................... 425/338, 556, 425/588, 589, 592, 438, 441, 444, 450.1, 451.5

[56] References Cited

U.S. PATENT DOCUMENTS

| | | |
|---|---|---|
| 2,586,474 | 2/1952 | Moore . |
| 2,941,249 | 6/1960 | Rogers . |
| 2,966,183 | 12/1960 | Werner . |
| 3,050,777 | 8/1962 | Siempelkamp . |
| 3,103,701 | 9/1963 | Calchera et al. . |
| 3,209,405 | 10/1965 | Loewenfeld . |
| 3,659,997 | 5/1972 | Rees . |
| 3,706,116 | 12/1972 | Drazick . |
| 3,767,352 | 10/1973 | Rees . |
| 3,807,929 | 4/1974 | Moore . |
| 3,941,548 | 3/1976 | Bruder . |
| 4,207,051 | 6/1980 | Wright et al. . |
| 4,243,369 | 1/1981 | James . |
| 4,273,524 | 6/1981 | Smith . |
| 4,403,810 | 9/1983 | Bieneck . |
| 4,408,981 | 10/1983 | Brown . |
| 4,718,845 | 1/1988 | Sheffield et al. . |
| 4,929,166 | 5/1990 | DiSimone et al. . |
| 4,938,682 | 7/1990 | Kadoriku et al. . |
| 4,969,812 | 11/1990 | Brown . |
| 5,052,908 | 10/1991 | Inaba et al. . |
| 5,104,308 | 4/1992 | Morton et al. . |
| 5,261,809 | 11/1993 | Koga . |
| 5,578,333 | 11/1996 | Schad et al. . |
| 5,707,666 | 1/1998 | DiSimone et al. . |

*Primary Examiner*—James P. Mackey
*Attorney, Agent, or Firm*—Lerner, David, Littenberg, Krumholz & Mentlik, LLP

[57] ABSTRACT

A mold assembly includes a stack of mold plates having a first plate and a second plate movable towards one another and away from one another in opening and closing directions between open and closed positions. The stack of mold plates includes a third plate disposed between the first and second plates. The mold assembly also includes a plate movement control device having at least one linkage. Each linkage may include a traveling element mounted to the third plate for movement along a predetermined path of motion relative to the third plate, a first arm having a first end pivotally connected to the traveling element and a second arm having a first end pivotally connected to the second plate and a second end pivotally connected to the traveling element. The at least one linkage is arranged so that upon movement of the first and second plates between the closed position and the open position, the third plate moves away from the first plate by a first predetermined distance and moves away from the second plate by a second predetermined distance.

34 Claims, 8 Drawing Sheets

MOLD PLATE CENTRALIZING SYSTEM

CROSS REFERENCE TO RELATED APPLICATIONS

This application claims benefit of U.S. Provisional Application Ser. No. 60/048,506 filed Jun. 4, 1997, the disclosure of which is hereby incorporated by reference herein.

FIELD OF THE INVENTION

BACKGROUND OF THE INVENTION

The present invention relates to injection molding systems having multi-plate stacks and more specifically relates to devices for controlling movement of one or more mold plates in a multi-plate stack.

U.S. Pat. Nos. 2,941,249 and 3,050,777 disclose injection molding assemblies having multi-plate stacks with simultaneous closure mechanisms capable of maintaining spacing between the several mold plates during opening and closing of the assembly.

U.S. Pat. No. 5,707,666 discloses an injection molding systems which use a lever arrangement for linking the various mold plates to affect displacement of all of the mold plates during opening and closing. For example, the '666 patent discloses an injection molding assembly including a first fixed platen and a second movable platen which moves relative to the first fixed platen. The mold assembly includes a plurality of sets of movable plates defining a plurality of mold cavities between each set of plates. The sets of plates are disposed axially to define a plurality of axial arranged mold stations capable of opening and closing simultaneously during operation of the mold assembly. A primary crank mechanism is pivotally connected to a central set of mold plates via a support member and is pivotally linked at opposed ends to the movable platen and the fixed platen. The connection to the platens is accomplished by pivotally mounted links. A secondary crank mechanism, including opposed pairs of smaller cranks supported pivotally and individually by sets of mold plates, are positioned on opposite sides of the central mold plates. Movement of the movable platen drives the primary cranks which, in turn, drives the secondary cranks, whereupon the primary and secondary cranks provide the motion to open and close the mold stations simultaneously. While this system can control movement of the mold plates, it can apply moments to the moving plates, causing the plates to cock or tilt about axes perpendicular to their direction of motion. Moreover, the crank system does not resist cocking of the central moving plate caused by other forces on the central plate, such as by frictional forces or forces exerted by the molded parts as they are being disengaged from the mold. Such cocking moments are resisted only by the guide pins on some of the plates in the mold slidably engaged in guide bushings on other plates. However, this can cause rapid wear of the guide bushings and can cause the guide pins to bind in the bushings.

The U.S. Pat. No. 3,767,352 discloses a generally similar arrangement of levers, and suffers from similar drawbacks. The '352 patent also provides for actuation of additional moving plates, commonly referred to as "ejector plates", which are used to dislodge the molded parts when the mold opens. However, to provide forces adjacent all four corners of each ejector plate, the '352 patent uses shafts extending laterally through the mold. These shafts consume valuable space within the mold.

Other arrangements have been proposed with movement devices such as hydraulic cylinders, jack screws and electric motors for actuating the various plates. These arrangements suffer from other drawbacks.

Thus, despite considerable effort in the art over many years, there remains a need for a stack mold with a movement device which can move the various plates reliably while still constraining the moving plates against cocking. There is a further need for a device which can provide these functions and which can also actuate ejector plates within the stack. Moreover, the movement device should be simple and reliable. Because space within the molding press is severely limited, the mechanism should be compact.

SUMMARY OF THE INVENTION

The present disclosure addresses these needs.

One aspect of the invention provides a mold assembly having a plate movement control device for controlling movement of one or more mold plates in a multi-plate stack so as to open the mold at two or more parting planes in response to opening and closing motion of the molding machine. The term "multi-plate stack" as used herein denotes an assembly of generally coextensive mold plates which are relatively movable along an axis substantially perpendicular to their major surfaces. Most commonly, the mold assembly defines two or more axially spaced mold cavities at these major surfaces. The articles molded within the mold cavities are removable therefrom upon opening of the mold assembly and axial separation of the mold plates.

A mold assembly according to this aspect of the invention includes a multi-plate stack of mold plates having a first plate and a second plate movable towards one another and away from one another in opening and closing directions between open and closed positions. The stack includes a third plate disposed between the first and second plates. The mold assembly includes a plate movement control device having at least one main linkage including a traveling element mounted to the third plate for movement along a predetermined path of motion relative to the third plate, a first arm having a first end pivotally connected to the first plate and a second end pivotally connected to the traveling element. Each main linkage also preferably includes a second arm having a first end pivotally connected to the second plate and a second end pivotally connected to the traveling element. At least one main linkage constrains the third or central plate of the stack against cocking, i.e. rotation around all axes perpendicular to the opening and closing directions.

The traveling element is preferably slidably mounted to the third plate for movement in directions substantially perpendicular to the opening and closing directions. An elongated guide may be provided on both sides of the third plate and the traveling element may be slidably mounted to the guide. In certain embodiments the multi-plate stack has a pair of opposite sides and a pair of main linkages are disposed on each side of the stack, so that the mold assembly includes four such main linkages in all. The pair of main linkages on each side of the mold provides balanced forces acting on the third or central plate in the stack, so that the mechanism does not tend to cause cocking of the plates. The most preferred main linkages fit into the relatively small spaces available alongside of the mold, and do not interfere with the mold or with the tie bars of the molding machine.

The pair of main linkages disposed on each side of the stack are preferably symmetrical. In other words, the pair of main linkages are generally mirror images of one another about a central horizontal plane extending in the opening and closing directions. All of the linkages are arranged so that upon movement of the first and second plates between the closed position and the open position, the third plate moves away from the first plate by a first predetermined distance and moves away from the second plate by a second predetermined distance.

In certain embodiments, the first and second predetermined distances are equal to one another. e.g. when the stack moves from the closed to the open position the distance between the first plate and the third plate is equal to the distance between the second plate and the third plate. However, in other preferred embodiments, the first and second predetermined distances may be unequal to one another, e.g. when the mold assembly is in the open position the distance between the first and third plate may be greater than the distance between the second plate and the third plate.

In certain preferred embodiments, the third plate includes one or more cavity plates, and may include a hot-runner manifold plate. In further embodiments, the first plate is a core plate, the second plate is a cavity plate and the third plate is a stripper plate.

The mold assembly desirably includes a fourth plate disposed between the first and second plates, the fourth plate being movable relative to the first and third plates. The mold assembly may also include an auxiliary linkage interconnecting the first arms of at least some of the linkages and the fourth plate so that upon pivoting movement of the first arms during opening and closing of the multi-plate stack, the fourth plate will move away from and towards the first plate. Most preferably, such auxiliary linkages are provided between the fourth plate and the first arms of all of the main linkages, so that actuating forces are provided adjacent all four corners of the fourth plate. Because four main linkages are provided, this can be accomplished readily. Each auxiliary linkage desirably includes a lost-motion arrangement or other delayedaction mechanism so that motion of the fourth plate away from the first plate does not commence until after the third plate has moved through a considerable distance from the first plate. As such, the fourth plate will initially remain in contact with the first plate when opening of the stack commences.

Movement of the fourth plate will commence only after the first and third plates have moved a predetermined distance away from one another. This feature is particularly beneficial when the fourth plate is an ejector or stripper plate and the first and second plates include core plates and cavity plates, respectively, because it is desirable to delay activation of the stripper plate until after the core and cavity plates have moved away from one another. In a variant, the auxiliary linkages for the fourth plate may be connected between the fourth plate and the third plate, rather than between the fourth plate and the arms of the main linkages.

The mold assembly may also include a fifth plate disposed between the second and third plates, the fifth plate being capable of moving toward and away from the first and second plates. The mold assembly may also include auxiliary linkages engaged between the second arms of at least some of the linkages and the fifth plate, or between the third plate and the fifth plate, so that upon pivoting movement of the second arms during opening and closing of the stack, the fifth plate will move away from and toward the second and third plates. These linkages can be similar to the auxiliary linkages provided for the fourth plate.

A mold according to this aspect of the invention may also include one or more plate movement control devices which are disposed inside one or more mold plates. Placing the plate movement control devices inside the plates may satisfy certain regulatory requirements. A mold according to another aspect of the invention may include an extended mold assembly having multi-plate stacks which are arranged back-to-back for increasing the number of molded items which may be produced.

According to a further aspect of the invention, a mold assembly has a stack of mold plates including first, second and third plates as discussed above. Here again, the mold assembly includes a plate movement control device having at least one and preferably a pair of main linkages disposed on each side of the stack. As described above, each pair of linkages are preferably symmetrical to one another so that the linkages mirror one another when the stack moves between the closed position and the open position. Each main linkage includes first and second pivot elements which are pivotally mounted to the third plate. The pivot elements are connected to one another so that the pivot elements are constrained to move in unison with one another. The plate movement control device also includes a first arm having a first end pivotally connected to the first plate and a second arm pivotally connected to the first pivot element and a second arm having a first end pivotally connected to the third plate and a second end pivotally connected to the second pivot element. Here again, the main linkages prevent the plates from tilting and/or cocking during movement of the plates. The linkages are arranged so that upon movement of the first and second plates between the closed position and the open position, the third plate moves away from the first plate by a first predetermined distance and moves away from the second plate by a second predetermined distance. As mentioned above, the first and second predetermined distances may be equal, however, in other embodiments, the first and second predetermined distances may be unequal from one another.

In certain preferred embodiments, the pivot elements of each of the linkages may include gear teeth whereby the gear teeth of the pivot elements in each linkage interconnect the pivot elements with one another and thereby constrain the motion of the pivot elements. A mold according to this aspect of the invention may also include fourth and fifth plates as discussed above with reference to the preceding aspect of the invention, and may include auxiliary linkages for actuating the fourth and fifth plates.

DETAILED DESCRIPTION OF PREFERRED EMBODIMENTS

In accordance with one preferred embodiment of the present invention, an injection molding assembly includes a plate movement control device for controlling movement of one or more mold plates in a multi-plate stack. The plate movement control device opens and closes the mold at two or more parting planes in response to opening and closing motion of the molding assembly.

Figure 1:
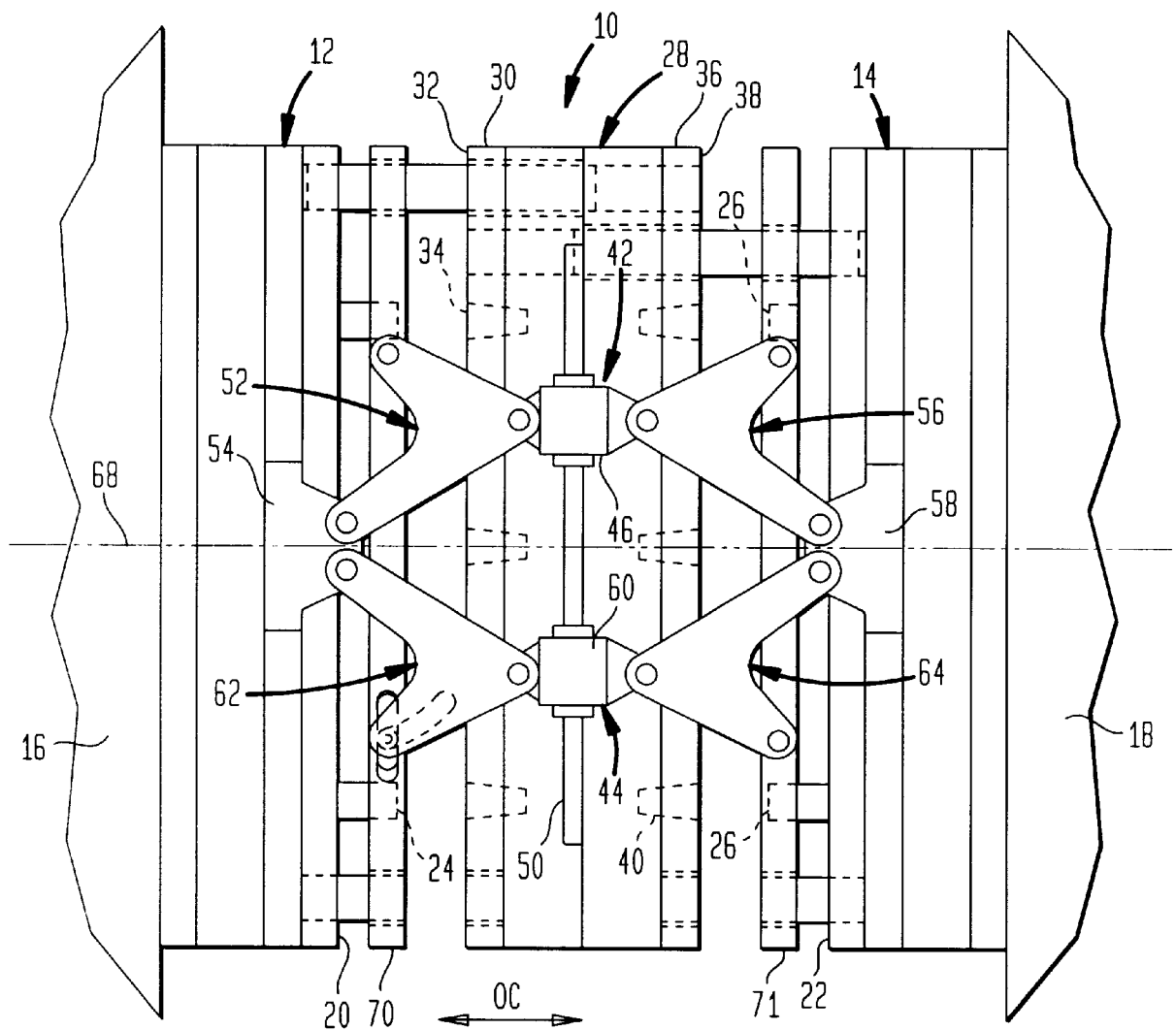
FIG. 1 shows a side view of a mold assembly having a stack of mold plates and including a plate movement control device having a pair of linkages disposed on each side of the stack, in accordance with one preferred embodiment of the present invention.
Figure 3:
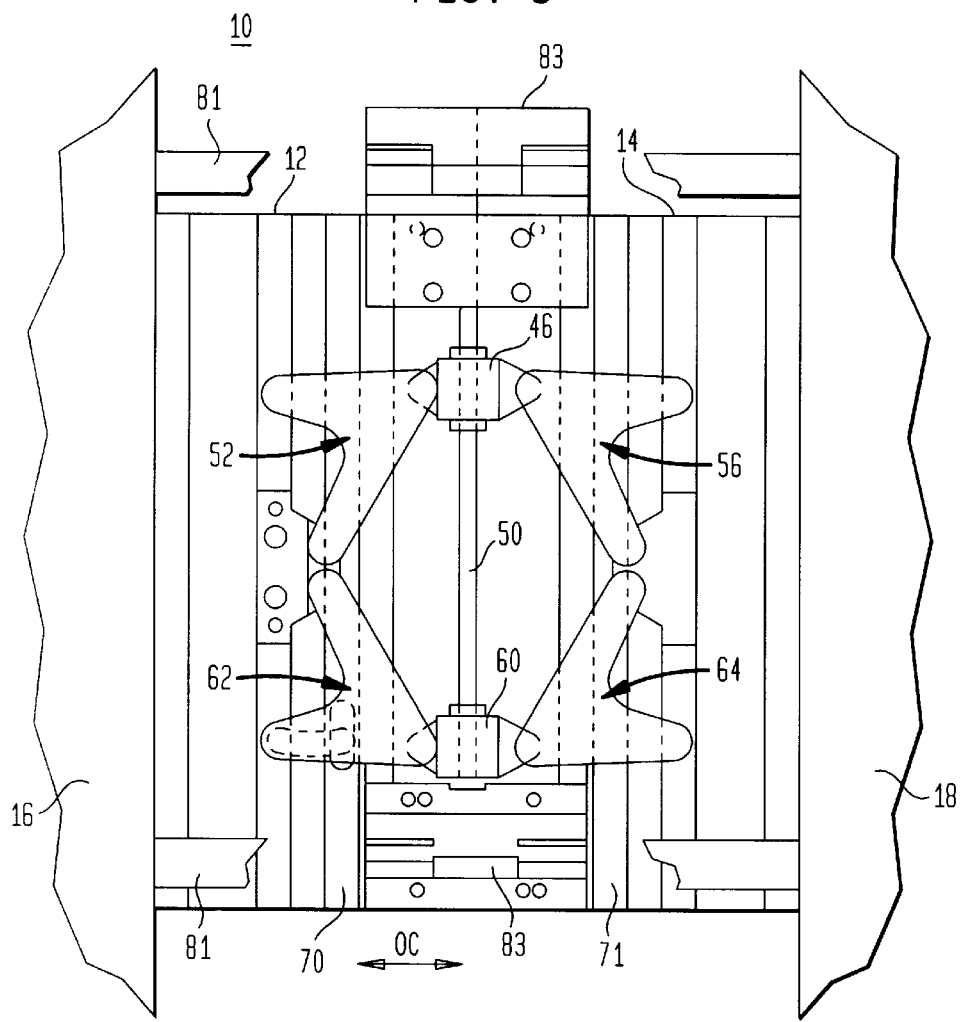
FIG. 3 shows a side view of the mold assembly shown in FIG. 1 when the stack of mold plates are in the closed position.

In one preferred embodiment of the present invention, a mold assembly includes a stack of mold plates 10 having a first plate 12 and a second plate 14 movable towards one another in opening and closing directions as indicated by arrow OC in FIG. 1, between the open position depicted in FIG. 1 and the closed position shown in FIG. 3. In use, the first plate 12 is mounted to the fixed platen 16 of an injection molding press, whereas the second plate 14 is mounted to a moving platen 18 actuated by the press mechanism (not shown). First plate 12 has a major face 20 which faces the second plate. The second plate has a major surface 22 which faces the first plate. The first plate 12 is a core plate having projecting molding elements or cores 24 extending from major surface 20. The second plate 14 is also a core plate, and has similar cores 26 projecting from major surface 22.

A third plate 28 is centrally disposed between the first plate and the second plate. The third plate preferably includes first and second manifold plates integrally connected to one another. The first manifold plate includes a first cavity plate 30 having a major face 32 which faces toward the first core plate 12. First cavity plate 30 has cavities 34 in major face 32, adapted to mate with the cores 24 of first plate 12. The second manifold plate includes a second cavity plate 36 having a major face 38 which confronts the second core plate 14, the second cavity plate having cavities 40 corresponding to the cores 26 of second plate 14.

The injection molding assembly also includes a plate movement control device for controlling movement of the multi-plate stack. The plate movement control device has a pair of main linkages including an upper linkage 42 and a lower linkage 44 which are disposed on the side of the stack visible in FIG. 1. The stack also includes a pair of main linkages disposed on an opposite side of the stack, i.e. a side of the stack which is not visible in FIG. 1. The upper linkage 42 includes an upper traveling element 46 which is mounted to the third plate for movement along a predetermined path of motion relative to the third plate substantially parallel to the major faces 34 and 38 of the third plate 28. To provide this predetermined path, the third plate includes a substantially vertical, elongated guide rail 50 mounted adjacent the center thereof and extending in a direction substantially perpendicular to the opening and closing directions of the mold assembly. The upper traveling element 46 of the upper linkage 42 is slidably mounted to the guide rail 50 for translational movement in vertical directions substantially perpendicular to the opening and closing directions of the mold assembly. Preferably, the sliding connection includes antifriction bearings, such as linear recirculating ball bearings or rollers (not shown). The upper linkage 42 includes a first arm 52 having a first end pivotally connected to the first plate 12 and a second end pivotally connected to the upper traveling element. Thus, the first plate 12 is provided with a mounting bracket 54 projecting forwardly from the plate itself, and the first arm is pivotally connected to the bracket. As bracket 54 is fixed to the first plate, it acts as part of the first plate during operation of the mechanism. The upper linkage also includes a second arm 56 having a first end pivotally connected to the second plate through a similar bracket 58 fixed to the second plate and a second end pivotally connected to the upper traveling element. The lower linkage 44 includes a lower traveling element 60 which is slidably mounted on guide rail 50 on the third plate for movement in directions substantially perpendicular to the opening and closing directions of the mold assembly. The lower linkage includes a first arm 62 having a first end pivotally connected to the first plate 12 through bracket 54 and a second end pivotally connected to the lower traveling element 60. The lower linkage also includes a second arm 64 having a first end pivotally connected to the second plate 14 through bracket 58 and the second end pivotally connected to the lower traveling element.

As shown in FIG. 1, the upper and lower linkages are symmetrical to one another; they are mirror images of one another about a central horizontal plane 68 extending in the opening and closing directions and extending from side-to-side through the mold, i.e., into and out of the plane of the drawing as seen in FIG. 1. As such, the movement of the linkages mirror one another when the mold assembly opens and closes. The symmetrical arrangement of the linkages causes equal and opposite forces to be exerted upon the plates during opening and closing of the mold assembly. As a result, the mold plates are constrained from tilting and/or cocking during opening and closing of the stack. Although the preferred linkages shown in FIGS. 1 and 3 center the third plate between the first and second plates when the mold is open, the dimensions of the linkage elements, such as the first and second arms, may be modified so as to position the third plate in other locations when the mold is open.

The injection mold assembly of FIG. 1 includes a fourth plate or stripper plate 70, which is disposed between the first or core plate 12 and the third plate 28 and a fifth plate or second stripper plate 71 disposed between the second plate 14 and the third plate 28. The stripper plate 70 is movable relative to the first plate 12 and the third plate 28 so that molded items may be readily detached from the core plate and removed from the mold assembly after a molding operation has been performed. In certain embodiments, the first arms 52 and 62 of the upper and lower linkages extend alongside the stripper plate 70. An auxiliary linkage preferably interconnects the first arms and the stripper plate 70 so that upon movement of the first arms during opening and closing of the stack, the stripper plate will move away from and towards the first plate 12. Each auxiliary linkage preferably includes a lost motion linkage arrangement which delays movement of the stripper plates until the core plates and the cavity plates have been separated by a predetermined distance.

Figure 2:
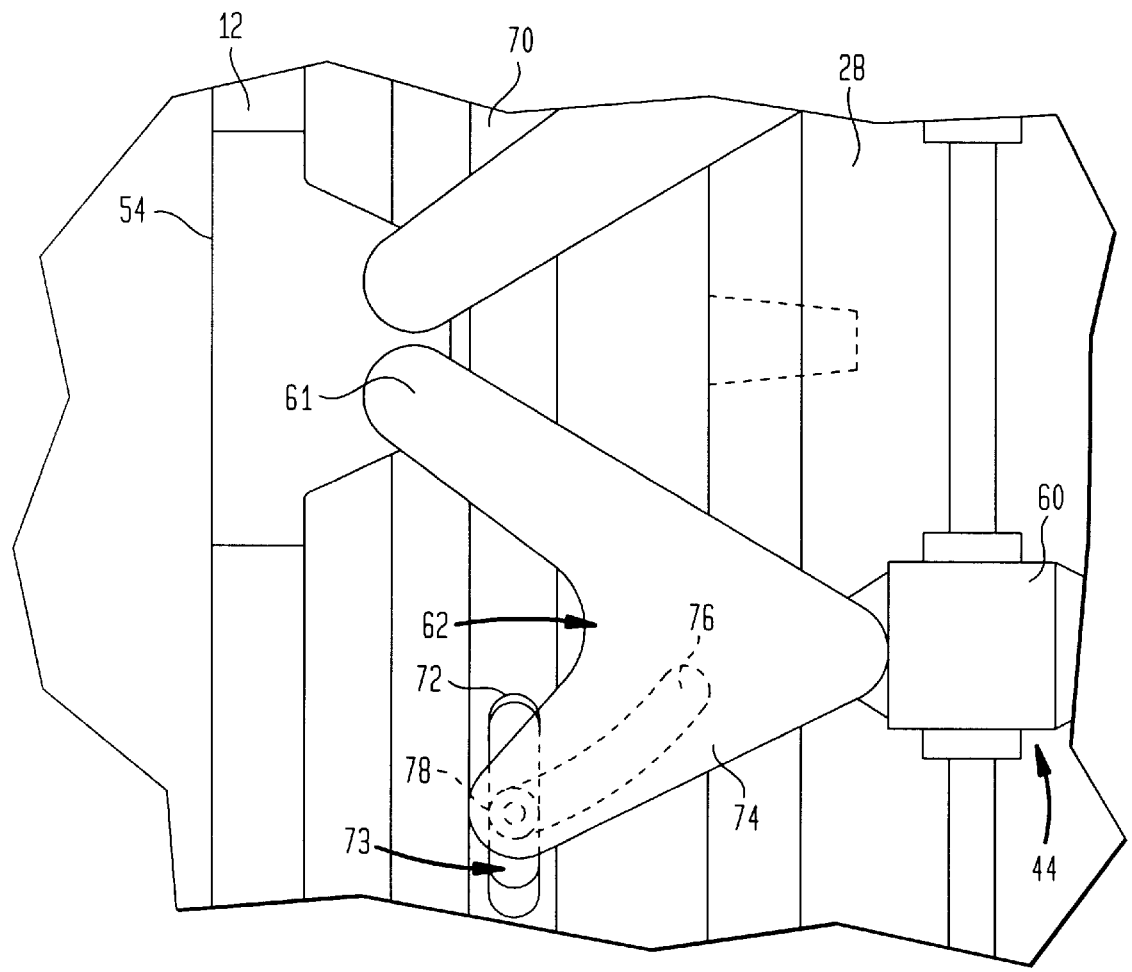
FIG. 2 shows a detailed side view of one of the linkage arms shown in FIG. 1.

FIG. 2 shows a detailed close-up view of the auxiliary linkage interconnecting the first arm 62 with the first stripper plate 70. The stripper plate includes a substantially vertical, elongated slot 72 formed in a side wall portion thereof. The auxiliary linkage includes a plate 74 integral with arm 62 extending alongside the stripper plate 70. Plate 74 has an elongated slot 76 formed therein. In certain embodiments, the elongated slot 76 may extend completely through plate 74. The elongated slot may have the shape of an arc following a predetermined curvature. A pin or roller 78 is rotatably mounted on an intermediate element 73 which in turn is slidably mounted in the slot 72 in the stripper plate 70 for movement in substantially vertical directions. The roller 78 is engaged in the slot 76 in the plate 74 of arm 62, so that the roller is free to traverse the length of the slot 76 during opening and closing of the mold assembly. Thus, the surfaces of the slot act as cam surfaces which control the motion of roller 78, and the roller acts as a cam follower. Similar auxiliary linkages are provided at each of the other arms of the main linkages. Thus, four auxiliary linkages connect fourth plate 70 to the first arms 52 and 62 of the main linkages visible in FIG. 1, and to the first arms of the other main linkages on the opposite side of the mold. Likewise, four auxiliary linkages connect the fifth plate 71 to the second arms 56 and 64 of the main linkages visible in FIG. 1 and to the second arms of the other linkages on the opposite sides of the mold.

The auxiliary linkage provides a lost motion linkage between the stripper plate 70 and the lower linkage 44 which delays movement of the stripper plate 70 until the first plate 12 and the third plate 28 have moved a predetermined distance away from one another. In other words, the stripper plate 70 does not immediately move away from the first plate 12 upon initial movement of the first and third plates away from one another. The delayed activation of the stripper plate allows a sufficient gap to open between the first plate 12 and the third plate 28 before the stripper plate 70 moves thereby preventing the molded items from being improperly or insufficiently detached from the first plate 12 upon opening the mold assembly. The other linkages associated with the fifth plate 71 act in the same manner.

The auxiliary linkage mechanism can be varied. For example, depending upon the shape of the cam surface, the desired movement of the stripper plate can be achieved with a cam follower directly mounted on the stripper plate, without the use of an intermediate link. Also, a sliding follower rather than a roller follower can be employed. The arrangement can be reversed, to place the cam on the fourth plate and the follower on the arm of the mechanism, or on an intermediate element movably connected to the arm.

Figure 4:
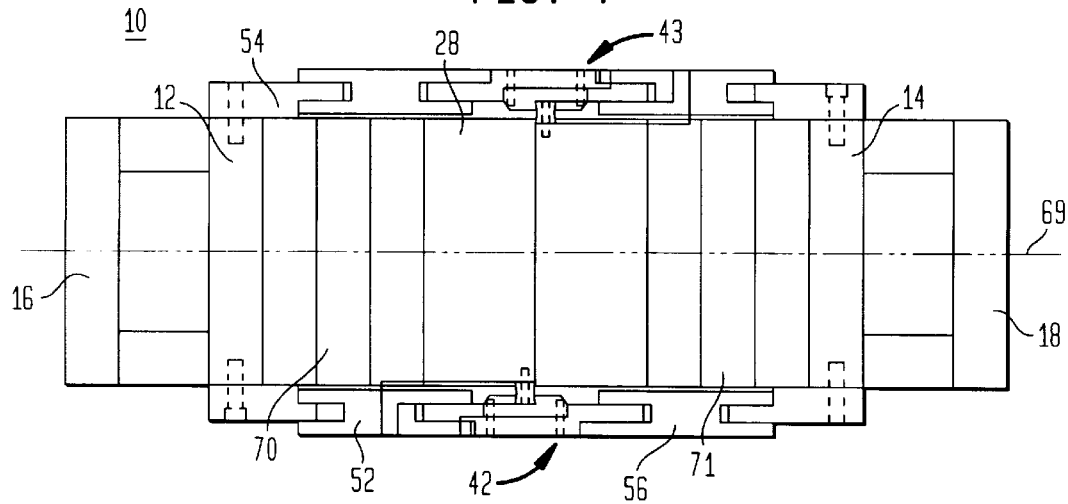
FIG. 4 shows a top view of the mold assembly shown in FIG. 3.

FIGS. 3 and 4 show respective side and top views of the mold assembly 10 in the closed position. FIG. 3 also depicts the tie bars 81 of the molding machine and riders 83 which optionally may be provided on connected to the center or third plate to engage the tie bars. These features are omitted in the other drawings for clarity of illustration. The stack includes a pair of main linkages disposed on each side of the stack. Thus, as seen in top view, the first main linkage 42 of one pair is disposed on a first side of the mold, whereas the first main linkage 43 of another pair is disposed on the second, opposite side of the mold. The two pairs most preferably are mirror images of one another about a vertical medial plane 69 extending midway between the sides of the mold and extending in the opening and closing directions. In other words, the mold includes four main linkages in all with two main linkages disposed on each side of the mold.

When the molding machine is actuated to move platen 18 toward platen 16 to close the mold, the second plate 14 is forced toward the first plate 12. As the second plate 14 moves to the left as seen in FIG. 1, the first and second arms of the upper and lower linkages pivot away from one another which, in turn, causes the upper and lower traveling elements 46 and 60 to move away from one another in opposite vertical directions along the substantially vertical guide rail 50. The traveling elements 46 and 60 are constrained by the arms and by their sliding connection to a common guide rail so that they can only move in unison and as the first and second plates move toward one another. The traveling elements must remain in a plane centered between the first and second plates. The traveling elements therefore constrain third or central plate 28 against rotation about axes transverse to the opening and closing directions.

As the arms of the linkages move in the closing motion of the mold, the auxiliary linkages close the stripper plates or fourth and fifth plates 70 and 71. For example, in the closing motion of the mold, arm 62 swings in the clockwise direction as seen in FIG. 2 about its pivot point 61 on first plate 12. The cam surfaces of slot 76 force roller 78 and intermediate element 73 downwardly and to the left as seen in FIG. 2, thereby moving the fourth plate or stripper plate 70 to the left.

In the closed position, the plates of the multi-plate stack are in close engagement with one another and there exists substantially no distance or gap between adjacent plates. A flowable polymer material, such as material in a molten state, may be introduced through the manifold plates into the cavities between the mold plates. After the resinous material has been cooled and hardened, the mold assembly is once again opened (FIG. 1) so that the molded items formed within the mold assembly may be removed from the mold cavities.

Referring to FIG. 1, when opening the mold assembly, the second plate 14 moves to the right and away from the first plate 12. As the second plate 14 continues moving to the right, the first and second arms of the upper and lower linkages pivot toward one another which moves the upper and lower traveling elements 46 and 60 to move toward one another. Once again, the third plate or central plate is constrained against tilting. In the opening motion of the mold, arm 62 pivots in the counterclockwise direction about point 61, so that the cam surface within slot 76 moves cam follower or roller 78 upwardly and to the right as seen in FIG. 2. The other auxiliary linkages act in the same way. The mechanism provides balanced forces on the stripper plates, and pulls the stripper plates near all four corners. Moreover, the stripper plate activation is provided without consuming any appreciable space within the mold itself.

Figure 5:
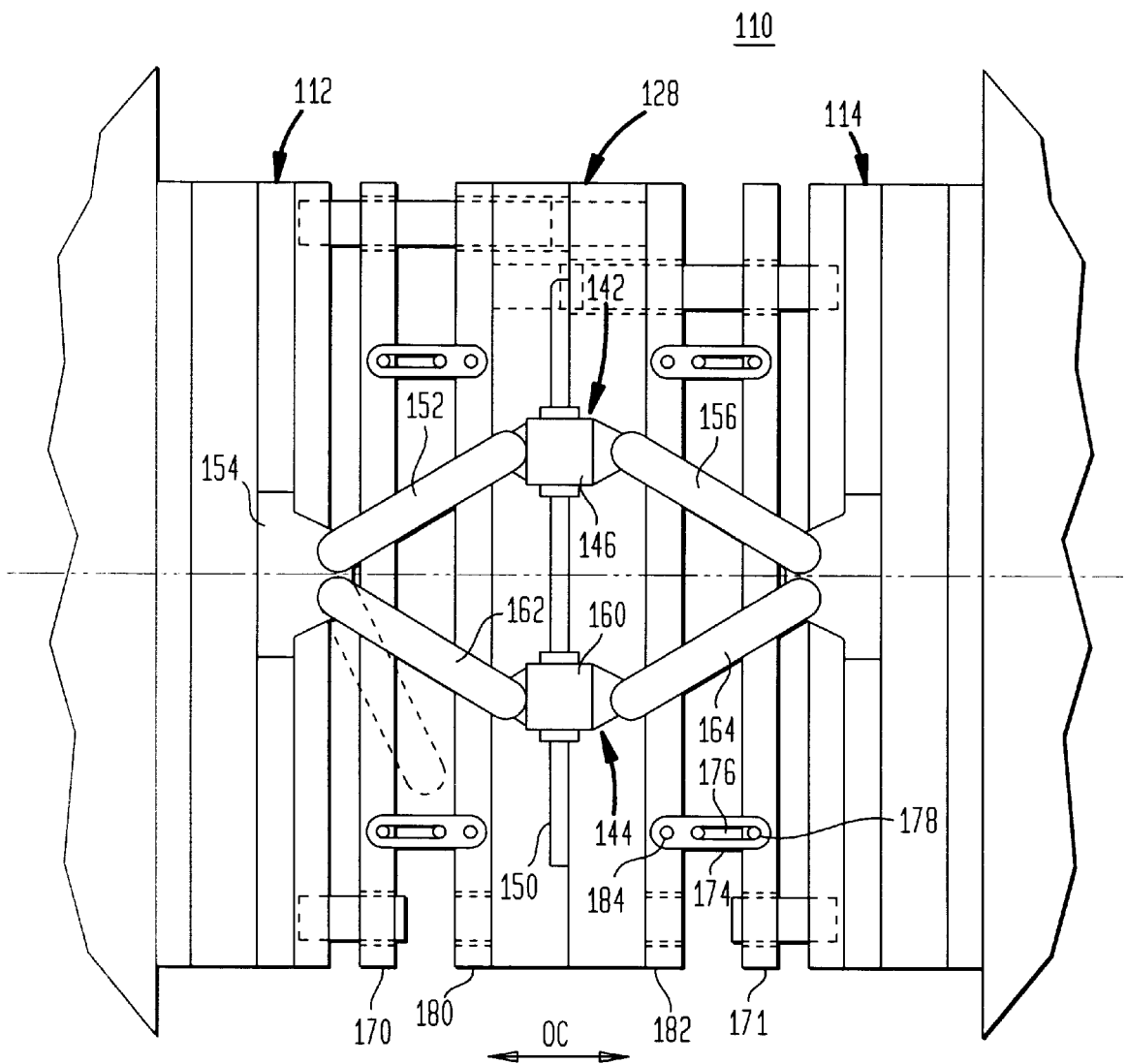
FIG. 5 shows a side view of a mold assembly including a plate movement control device in accordance with further preferred embodiments of the present invention.
Figure 6:
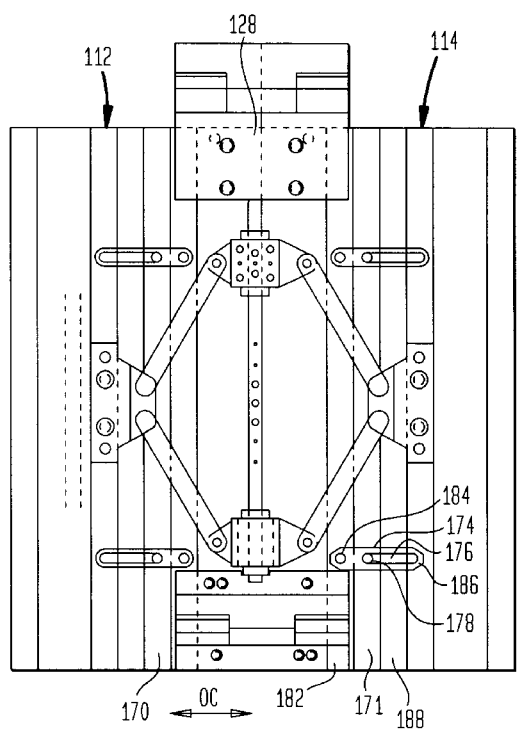
FIG. 6 shows a side view of the mold assembly shown in FIG. 5 when the mold assembly is in the closed position.

FIGS. 5 and 6 show a mold assembly in accordance with another preferred embodiment of the present invention. The plates of the mold assembly are substantially similar to those described above and shown in FIG. 1. The mold assembly 110 includes a first plate 112 and a second plate 114 movable towards and away from one another in opening and closing directions between open and closed positions. The mold assembly includes a third plate 128 disposed between the first and second plates. The third plate 128 includes a manifold having first and second cavity plates secured on opposite faces thereof. The first cavity plate 180 faces the first plate 112 and the second cavity plate 182 faces the second plate 114.

The first, second and third plates are linked by a plate movement control device which includes a pair of linkages 142 and 144 provided on each side of the stack. FIG. 5 shows one pair of linkages provided on a side of the stack which is visible in the figure. The assembly preferably includes a pair of linkages provided on an opposite side of the stack which is not visible in FIG. 5. Each linkage includes traveling elements which are slidably mounted to the third plate 128 for movement in directions transverse or substantially perpendicular to the opening and closing directions of the mold assembly. Specifically, the third plate 128 includes a substantially vertical guide rail 150 provided thereon with an upper traveling element 146 and a lower traveling element 160 slidably mounted on the guide rail 150. The upper traveling element 146 includes a first arm 152 having a first end pivotally connected to the first plate 112 and a second end pivotally connected to the upper traveling element 146. The upper traveling element 146 also includes a second arm 156 having a first end pivotally connected to the second plate 114 and a second end pivotally connected to the upper traveling element 146. The lower linkage 144 includes the lower traveling element 160, a first arm 162 having a first end pivotally connected to the first plate 112 and a second end pivotally connected to the lower traveling element 160. The lower linkage 144 also includes a second arm 164 having a first end pivotally connected to the second plate 114 and a first end pivotally connected to the lower traveling element 160. The upper and lower linkages 142 and 144 are substantially symmetrical with one another and their respective movements are substantially mirror images of one another. The linkages prevent the third plate 128 of the multi-plate stack from tilting and cocking during opening and closing of the plates.

Referring to FIGS. 5 and 6, the mold assembly also includes a first stripper plate 170 disposed between the first plate 112 and the third plate 128 and a second stripper plate 171 disposed between the second plate 114 and the third plate 128. As mentioned above, the stripper plates are provided for moving toward and away from core plates for removing molded items therefrom. Referring to FIG. 6, the second cavity plate 182 included in third plate 128 is interconnected with the second stripper plate 171 through an auxiliary linkage such as a lost motion link strap 174. The lost motion link strap 174 includes a first end 184 which is secured to the second cavity plate 182 and a second end 186 which extends alongside the second stripper plate 171. The second end 186 of the link strap 174 includes a slot 176 formed therein for receiving a pin 178 secured to the stripper plate 171. Similar linkages (not shown) are provided at other locations on the mold. Preferably, four such linkages connect the second stripper plate to the third plate 128 adjacent all four corners of the second stripper plate 171. Likewise, four similar linkages (not shown) connect the fourth plate or stripper plate 170 to the third plate 128 adjacent the four corners of stripper plate 170.

Upon opening the mold assembly 110, the stripper plates 170 and 171 do not immediately move away from the core plates because the stripper plates are connected to the cavity plates 180 and 182 via the auxiliary linkages. For example, as the third plate 128 moves away from the second plate 114, the stripper plate 171 initially remains in contact with the second core plate 188. However, after the third plate 128 has moved a predetermined distance away from the second plate 114, the pin 178 extending from the side of the stripper plate 171 reaches the end of the slot 176 in the lost motion linkage 174. Once the pin 178 reaches the end of the slot 176, further movement of the third plate 128 away from the second plate 114 causes the stripper plate 171 to move away from the second core plate 188 holding the molded items which forces the molded items off of the core plate. In this embodiment as well, the mechanism provides balanced forces on the stripper plates, and pulls the stripper plates near all four corners. Here again, the stripper plate activation is provided without consuming any appreciable space within the mold itself.

Figure 7:
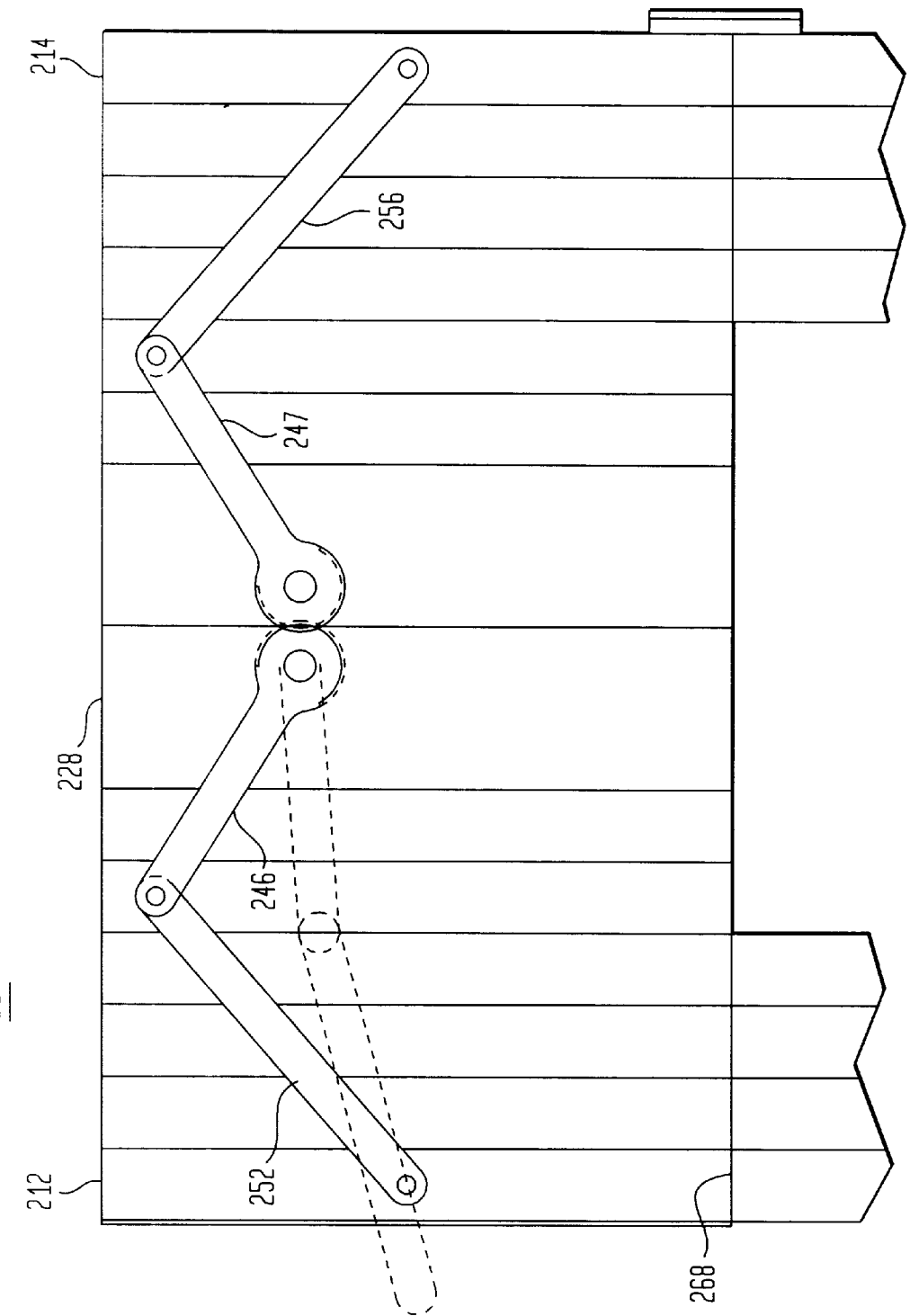
FIG. 7 shows a fragmentary side view of a mold assembly including a plate movement control device in accordance with still further preferred embodiments of the present invention.

FIG. 7 shows a mold assembly 210 in accordance with another embodiment of the present invention in which the linkages are arranged so that upon movement of the first and second plates 212 and 214 between the closed position and the open position, the third plate 228 moves away from the first plate 212 by a first predetermined distance and moves away from the second plate 214 by a second predetermined distance. The mold assembly includes a plate movement control device having at least one and preferably a pair of linkages disposed on each side of the stack. FIG. 7 shows only one linkage of the pair of linkages on one side of the stack. Preferably, a lower linkage, identical to the linkage shown, is provided below the center line 268 of the stack. Each linkage includes first and second pivot elements 246 and 247 which are pivotally mounted to the third plate 228. The first and second pivot elements 246 and 247 include gear teeth which mesh with one another. The gear teeth interconnect the pivot elements with one another and thereby constrain the motion of the first and second pivot elements so that the pivot elements must move in unison.

The linkage includes the first pivot element 246 pivotally connected to a first arm 252. The first arm 252 has a first end pivotally connected to the first plate 212 and a second end pivotally connected to the first pivot element 246. The linkage also includes a second arm 256 having a first end pivotally connected to the second plate 214 and a second end pivotally connected to the second pivot element 247. The mold assembly may also include fourth and fifth plates as described above as well as auxiliary linkages for moving the fourth and fifth plates.

Figure 8:
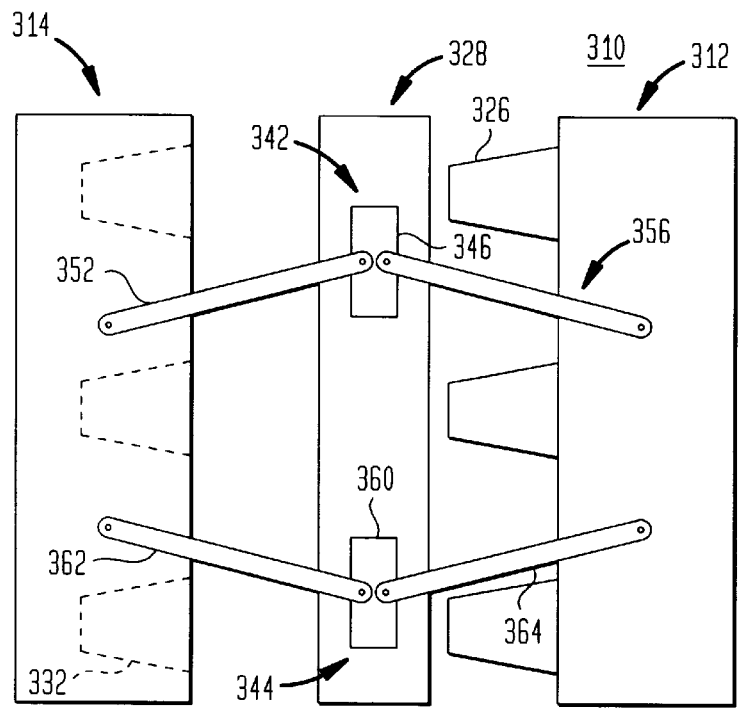
FIG. 8 shows a schematic side view of a mold assembly in accordance with further preferred embodiments of the present invention.

FIG. 8 shows a mold assembly 310 in accordance with another embodiment of the present invention including a first plate 312 including a core plate having cores 326 thereon, a second plate 314 including a cavity plate with cavities 332 therein and a third plate 328 including a stripper plate. The core plate 312 and the cavity plate 314 are movable towards and away from one another in opening and closing directions between open and closed positions, and the stripper plate 328 is disposed between the core plate and the cavity plate. The stack has a pair of opposite sides. The assembly includes a plate movement control device having at least one and preferably a pair of linkages disposed on each side of the stack. The assembly may also include one or more linkages disposed inside the plates of the stack. The linkages are preferably similar to those described above with reference, but no auxiliary linkages are provided. The pair of linkages include an upper linkage 342 having an upper traveling element 346 mounted to the stripper plate 328 for movement along a predetermined path of motion relative to the stripper plate. The upper linkage includes a first arm 352 having a first end pivotally connected to the core plate 312 and a second end pivotally connected to the upper traveling element 346 and a second arm 356 having a first end pivotally connected to the cavity plate 314 and a second end pivotally connected to the upper traveling element 346. The pair of linkages also includes a lower linkage 344 having a lower traveling element 360 mounted to the stripper plate 328 for movement along a predetermined path of motion relative to the stripper plate. The lower linkage includes a first arm 362 having a first end pivotally connected to the core plate 312 and a second end pivotally connected to the lower traveling element 360 and a second arm 364 having a first end pivotally connected to the cavity plate 314 and a second end pivotally connected to the lower traveling element 360. The upper and lower linkages 342 and 344 are arranged so that upon movement of the core plate and the cavity plate between a closed position and an open position, the stripper plate moves away from the core plate by a first predetermined distance and moves away from the cavity plate by a second predetermined distance. In this action, the stripper plate strips molded articles from cores 326 as the mold opens. This arrangement is merely illustrative of the various ways in which the mechanism according to the present invention can be employed actuate various plates within a mold stack.

Figure 9:
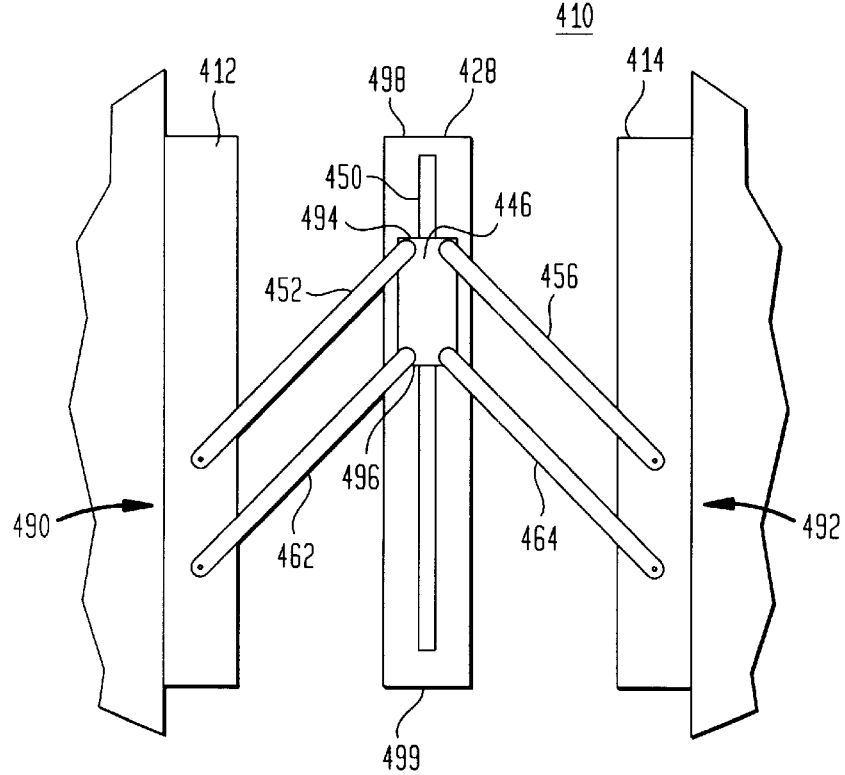
FIG. 9 shows a cross-sectional view of a mold assembly with a plate movement control device in accordance with further preferred embodiments of the present invention.

FIG. 9 shows a cross-sectional view of a multi-plate stack in a mold assembly in accordance with another embodiment of the present invention. The mold assembly 410 includes a first plate 412, a second plate 414 and a third plate 428. Although not shown, the mold assembly 410 may also include stripper plates between the first and third plates and between the second and third plates. The first and second plates are movable towards and away from one another in opening and closing directions between open and closed positions, and the third plate 428 is disposed between the first and second plates. The assembly includes a plate movement control device which is provided within a slot inside the mold assembly, desirably adjacent the vertical midplane of the assembly. The plate movement control device depicted includes a traveling element 446 slidably mounted to a substantially vertical guide rail 450. The plate movement control device also preferably includes a pair of parallelogram linkages including the traveling element 446. The first parallelogram linkage 490 includes a first arm 452 having a first end pivotally connected to the first plate 412 and a second end pivotally connected to an upper end 494 of the traveling element 446, and a second arm 462 having a first end pivotally connected to the first plate 412 and a second end pivotally connected to a lower end 496 of the traveling element 446. The first and second arms of the first parallelogram linkage 490 remain substantially parallel to one another as the plates move between the open and closed positions. The second parallelogram linkage 492 includes a first arm 456 having a first end pivotally connected to the second plate 414 and a second end pivotally connected to the upper end 494 of the traveling element 446, and a second arm 464 having a first end pivotally connected to the second plate 414 and a second end pivotally connected to the lower end 496 of the traveling element. The first and second arms 456 and 464 of the second parallelogram linkage 492 also remain substantially parallel to one another as the plates move between the open and closed positions.

When the mold assembly moves toward the closed position the traveling element 446 slides upwardly on the guide rail 450 until it reaches a location adjacent an upper end 498 of the third plate 428 and the linkage arms pivot downwardly toward a lower end 499 of the third plate. Conversely, as the mold assembly is opened, the traveling element 446 slides downwardly on the guide rail 450 toward the lower end 499 of the third plate 428 and the linkage arms pivot upwardly toward the upper end 498 of the third plate. The parallelogram linkages constrain the traveling element against rotation, and the traveling element in turn constrains third plate 428 against rotation. This embodiment, which incorporates only a single traveling element, is less preferred in that it does not provide support to the third plate at widely-spaced points. Stated another way, tilting moments applied on the third plate 428 will result in relatively high reaction forces in the arms and relatively high forces in the sliding connection between the traveling element and rail 450. By contrast, in the embodiment of FIGS. 1–4, the third plate is supported at widely-spaced locations, i.e., at the two traveling elements.

In other variations of the embodiment shown in FIG. 9, the mold assembly may include two or more plate movement control devices having parallelogram linkages. The movement control devices may be positioned inside the plates or may be positioned outside the plates on opposite sides of the stack. In still other embodiments, additional pivoting arms may be added on both sides of the traveling element. For example, in the embodiment shown in FIG. 9, a third pivoting arm may be added on both sides of the traveling element 446. The traveling element may be longer in the vertical direction. The mold may also include fourth and fifth plates similar to those described above which are interconnected with the plate movement control device via auxiliary linkages as described above. In a further variant, mechanisms having two linkages, one above the other, such as the two linkages 42 and 44 of FIG. 1, can be modified so that the traveling elements of both linkages move in the same direction. For example, the lower linkage 44 can be inverted so that its traveling element 60 moves upwardly during mold closing as does the traveling element 46 of linkage 42. These embodiments are less preferred because they are not balanced, i.e., they do not provide support at evenly-spaced locations on the third plate.

Figure 10:
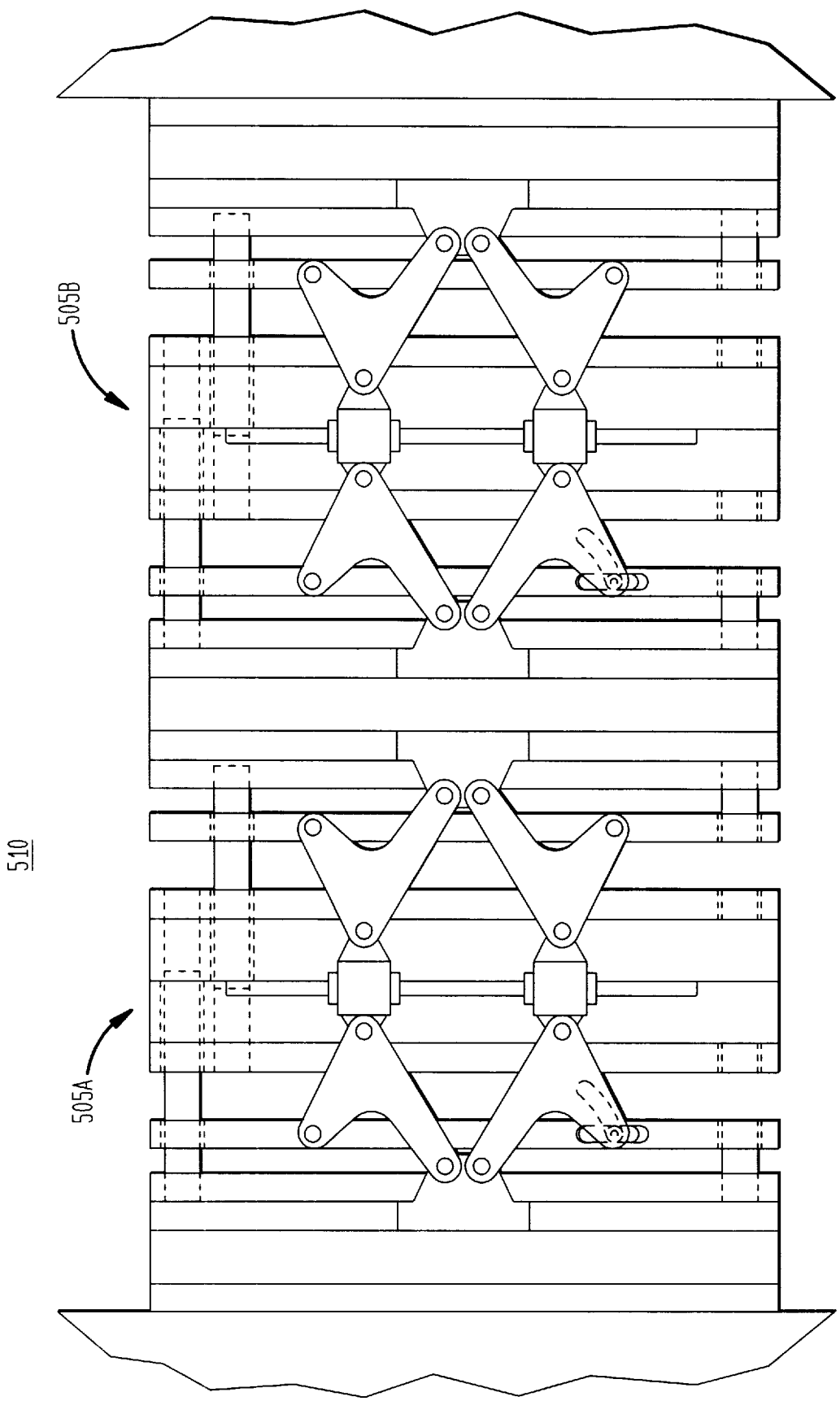
FIG. 10 shows a side view of an extended mold assembly having multi-plate stacks which are arranged back-to-back in accordance with further preferred embodiments of the present invention.

FIG. 10 shows yet another embodiment of the present invention including an extended mold assembly having plural multi-plate stacks which are arranged back-to-back for increasing the number of molded items which may be produced by the mold. The extended mold assembly includes a first mold assembly portion 505A and a second mold assembly portion 505B. The mold plates and linkages shown in FIG. 10 are substantially similar to those shown in FIG. 1, however, any of the mold assemblies described above may be arranged back-to-back to provide an extended mold assembly.

As will be appreciated, numerous variations and combinations of the features discussed above may be utilized without departing from the present invention as further defined by the claims. For example, the mold assemblies described above may be modified to add additional sets of mold plates. In addition, more linkages can be used per side to improve stabilization of the molds and minimize cocking and/or tilting of the mold plates tilting. On the other hand, fewer linkages may be utilized. Also, the embodiments which incorporate linkages on the sides of the mold may be provided with cover plates attached to the mold and covering the linkages to prevent access during operation. The assemblies discussed above can be modified to place the mechanism on the top and bottom sides of the mold, rather than on the vertically-extending sides of the mold. In this case it is preferred to remove of the molded parts without the parts falling downwardly through the lower mechanism. Accordingly, the foregoing description of the preferred embodiments should be taken by way of illustration rather than by way of limitation of the invention.

What is claimed is:

1. In a mold assembly having:
   (a) a stack of mold plates including a first plate and a second plate movable towards one another and away from one another in opening and closing directions between open and closed positions, and a third plate disposed between said first and second plates; and
   (b) a plate movement control device comprising at least one linkage including:
      (1) a traveling element mounted to said third plate for movement along a predetermined path of motion relative to the third plate;
      (2) a first arm having a first end pivotally connected to the first plate and a second end pivotally connected to the traveling element; and
      (3) a second arm having a first end pivotally connected to the second plate and a second end pivotally connected to the traveling element, said at least one linkage being arranged so that upon movement of said first and second plates between said closed position and said open position, said third plate moves away from said first plate by a first predetermined distance and moves away from said second plate by a second predetermined distance, said at least one linkage constraining said third plate against rotation around all axes perpendicular to said opening and closing directions.

2. The mold assembly as claimed in claim 1, wherein said stack has a pair of opposite sides and a pair of said linkages are disposed on each side of said stack.

3. The mold assembly as claimed in claim 2, wherein each pair of said linkages are arranged for simultaneous movement.

4. The mold assembly as claimed in claim 1 wherein said traveling element of each said linkage is slidably mounted to said third plate for movement in directions substantially perpendicular to said opening and closing directions.

5. The mold assembly as claimed in claim 1 wherein said first and second predetermined distances are equal.

6. The mold assembly as claimed in claim 1 wherein said first and second predetermined distances are unequal.

7. The mold assembly as claimed in claim 1 wherein said third plate includes a hot-runner manifold plate.

8. The mold assembly as claimed in claim 1 wherein said first plate includes a core plate, said second plate includes a cavity plate, and said third plate includes a stripper plate.

9. The mold assembly as claimed in claim 1 further comprising a fourth plate disposed between said first and third plates, said fourth plate being movable in said opening and closing directions relative to said first and third plates.

10. The mold assembly as claimed in claim 9 further comprising an auxiliary linkage engaged between said first arms of at least some of said linkages and said fourth plate so that upon pivoting movement of said first arms during opening and closing of the stack, said fourth plate will move away from and towards the first plate.

11. The mold assembly as claimed in claim 10, whereby each said auxiliary linkage comprises a cam surface and a cam follower connected between said fourth plate and one of said first arms.

12. The mold assembly as claimed in claim 11 wherein each said cam surface is disposed on one of said first arms and wherein each said follower is connected to said fourth plate.

13. The mold assembly as claimed in claim 12 wherein each said auxiliary linkage further includes an intermediate element movably mounted to said fourth plate, said cam follower being mounted on said intermediate element.

14. The mold assembly as claimed in claim 13 wherein each said intermediate element is mounted to said fourth plate for movement in directions substantially perpendicular to said opening and closing directions.

15. The mold assembly as claimed in claim 11 wherein said auxiliary linkages are connected between all of said first arms and said fourth plate.

16. The mold assembly as claimed in claim 9 further comprising a plurality of auxiliary linkages connecting said third plate to said fourth plate so that during motion of said third plate away from said first plate, said third plate will pull said fourth plate away from said first plate.

17. The mold assembly as claimed in claim 9 further comprising a fifth plate disposed between said second and third plates, whereby the second arm of each said linkage will extend alongside said fifth plate, said fifth plate being movable relative to said second and third plates.

18. The mold assembly as claimed in claim 17, further comprising an auxiliary linkage engaged between said second arms of at least some of said linkages and said fifth plate so that upon pivoting movement of said second arms during opening and closing of the stack, said fifth plate will move away from and towards the second plate.

19. The mold assembly as claimed in claim 17 further comprising a plurality of auxiliary linkages connecting said third plate to said fifth plate so that during motion of said third plate away from said second plate, said third plate will pull said fifth plate away from said second plate.

20. The mold assembly as claimed in claim 17, wherein said fourth and fifth plates include stripper plates.

21. The mold assembly as claimed in claim 1, wherein said first and second plates include core plates.

22. The mold assembly as claimed in claim 21, wherein said third plate includes cavity plates defining cavities facing toward said first and second plates.

23. In a mold assembly having:
(a) a stack of mold plates including a first plate and a second plate movable towards one another and away from one another in opening and closing directions between open and closed positions, and a third plate disposed between said first and second plates, said stack having a pair of opposite sides;
(b) a plate movement control device comprising: a pair of linkages disposed on each side of the stack, each said linkage including:
(1) a traveling element mounted to said third plate for movement along a predetermined path of motion relative to the third plate;
(2) a first arm having a first end pivotally connected to the first plate and a second end pivotally connected to the traveling element; and
(3) a second arm having a first end pivotally connected to the second plate and a second end pivotally connected to the traveling element, all of said linkages being arranged so that upon movement of said first and second plates between said closed position and said open position, said third plate moves away from said first plate by a first predetermined distance and moves away from said second plate by a second predetermined distance.

24. In a mold assembly having:
(a) a stack of mold plates including a first plate and a second plate movable towards one another and away from one another in opening and closing directions between open and closed positions, and a third plate disposed between said first and second plates, said stack having a pair of opposite sides,
(b) a plate movement control device comprising at least one linkage including:
(1) first and second pivot elements pivotally mounted to said third plate, said pivot elements being connected to one another so that said pivot elements are constrained to move in unison with one another;
(2) a first arm having a first end pivotally connected to the first plate and a second end pivotally connected to the first pivot element; and
(3) a second arm having a first end pivotally connected to the second plate and a second end pivotally connected to the second pivot element, said at least one linkage being arranged so that upon movement of said first and second plates between said closed position and said open position, said third plate moves away from said first plate by a first predetermined distance and moves away from said second plate by a second predetermined distance.

25. The mold assembly as claimed in claim 24, wherein a pair of linkages are disposed on each side of said stack.

26. The mold assembly as claimed in claim 24, wherein said at least one linkage constrains said third plate against rotation around all axes perpendicular to said opening and closing directions.

27. The mold assembly as claimed in claim 24 wherein said pivot elements of each said linkage include gear teeth, and said gear teeth of the pivot elements in each linkage interconnect the pivot elements with one another and thereby constrain the motion of the pivot elements.

28. The mold assembly as claimed in claim 24 wherein said first and second predetermined distances are equal.

29. The mold assembly as claimed in claim 24 wherein said first and second predetermined distances are unequal.

30. The mold assembly as claimed in claim 24 further comprising a fourth plate disposed between said first and third plates, whereby the first arm of each said linkage will extend alongside of said fourth plate, said fourth plate being movable relative to said first and third plates.

31. The mold assembly as claimed in claim 30 wherein said first plate includes a core plate, said fourth plate includes a stripper plate, and said third plate includes a cavity plate.

32. The mold assembly as claimed in claim 30 further comprising an auxiliary linkage engaged between said first arms of at least some of said linkages and said fourth plate so that upon pivoting movement of said first arms during opening and closing of the stack, said fourth plate will move away from and towards the first plate.

33. The mold assembly as claimed in claim 32 further comprising a fifth plate disposed between said third and second plates and movable relative to said third and second plates.

34. The mold as claimed in claim 33, wherein said fourth and fifth plates include stripper plates.

* * * * *

UNITED STATES PATENT AND TRADEMARK OFFICE
CERTIFICATE OF CORRECTION

PATENT NO. : 6,015,283
DATED : January 18, 2000
INVENTOR: Daniel Mattia

It is certified that error appears in the above-identified patent and that said Letters Patent is hereby corrected as shown below:

Column 1, line 21, after discloses, delete -- an --.

Column 3, line 37, "delayedaction" should read --- delayed action --.

Column 7, line 48, after "on", insert -- or --.

Column 10, line 45, "include" should read -- includes --.

Column 11, line 5, after "employed", insert -- to --.

Column 12, line 46, delete "of".

Column 12, line 52, "In a" should read -- A --.

Column 14, line 18, "In a" should read -- A --.

Column 14, line 43, "In a" should read -- A --.

UNITED STATES PATENT AND TRADEMARK OFFICE
CERTIFICATE OF CORRECTION

PATENT NO.   : 6,015,283
DATED        : January 18, 2000
INVENTOR(S)  : Daniel Mattia It is certified that error appears in the above-identified patent and that said Letters Patent is hereby corrected as shown below:

Column 16, line 17, after "mold", insert --assembly--.

Signed and Sealed this

Sixth Day of March, 2001

NICHOLAS P. GODICI

Attesting Officer    Acting Director of the United States Patent and Trademark Office